(12) United States Patent
Dieker et al.

(10) Patent No.: US 9,375,731 B2
(45) Date of Patent: Jun. 28, 2016

(54) SELECTED SOLIDS SEPARATION

(71) Applicant: ICM, Inc., Colwich, KS (US)

(72) Inventors: Kurt A. Dieker, Maize, KS (US);
Charles C. Gallop, Gower, MO (US)

(73) Assignee: ICM, Inc., Colwich, KS (US)

( * ) Notice: Subject to any disclaimer, the term of this patent is extended or adjusted under 35 U.S.C. 154(b) by 824 days.

(21) Appl. No.: 13/665,729

(22) Filed: Oct. 31, 2012

(65) Prior Publication Data

US 2013/0121891 A1    May 16, 2013

Related U.S. Application Data

(60) Provisional application No. 61/554,438, filed on Nov. 1, 2011.

(51) Int. Cl.
*B01D 29/64*    (2006.01)
*B01D 33/00*    (2006.01)
(Continued)

(52) U.S. Cl.
CPC .............. *B04B 15/06* (2013.01); *B01D 29/62* (2013.01); *B01D 29/76* (2013.01); *B01D 37/00* (2013.01);
(Continued)

(58) Field of Classification Search
CPC .............. B01D 29/62; B01D 29/6469; B01D 29/6476; B01D 29/6484; B01D 29/6492; B01D 29/76; B01D 29/86; B01D 33/00; B01D 33/0003; B01D 33/0006; B01D 33/0041; B01D 33/0064; B01D 33/0067; B01D 35/02; B01D 37/00; B01D 61/02; B01D 61/10; B01D 61/14; B01D 61/20; B01D 65/02; B01D 2201/089; B01D 2221/00; B01D 2311/06; B01D 2311/08; B01D 2311/26; B01D 2311/2676; B01D 29/64; B01D 33/44; B01D 33/46; B01D 33/461; B01D 33/465; B01D 33/466; B01D 33/58; B01D 33/62; B01D 33/64; B01D 33/646; B01D 65/08; B01D 67/00; B01D 67/0009;
B01D 2211/00; C11B 1/00; C11B 1/02; C11B 1/04; C11B 1/06; C11B 3/00; C11B 3/008; C10L 1/18; C10L 1/1802; C10L 7/04; C10L 1/1806
USPC ......... 210/650, 651, 708, 774, 787, 784, 804, 210/806, 350, 386, 396, 400, 781, 783, 210/321.87, 321.69, 321.78; 44/301, 302, 44/307, 308, 605; 554/8, 9, 20, 21, 175, 554/177; 426/417, 425, 429, 431, 490–493; 208/15–17, 311, 322, 339
See application file for complete search history.

(56) References Cited

U.S. PATENT DOCUMENTS 4,316,808 A  *  2/1982  Blair, Jr. .................. 507/202
4,342,657 A  *  8/1982  Blair, Jr. .................. 507/240
(Continued)

FOREIGN PATENT DOCUMENTS

WO    WO-2010138110 A1    12/2010
WO    WO-2013/066885 A1    5/2013

OTHER PUBLICATIONS

Canadian Application Serial No. 2,794,369, Notice of Allowance mailed Sep. 19, 2013, 1 pg.
(Continued)

*Primary Examiner* — Joseph Drodge
(74) *Attorney, Agent, or Firm* — Schwegman Lundberg & Woessner, P.A.

(57) ABSTRACT

A process is disclosed which includes separating selected solids from a process stream with a selected solids mechanical processor containing a filter to produce a filtrate substantially free of selected solids and a retentate containing recovered selected solids. In one embodiment, the process stream contains an increased amount of liquid is provided to a downstream mechanical processor as compared to a process stream having no selected solids mechanical processor upstream. The selected solids mechanical processor can be a dynamic filtration device or a static separation device. Bio-oil recovery efficiency, quantity, and quality can be improved as a result.

13 Claims, 6 Drawing Sheets

(51) Int. Cl.
*B01D 65/02* (2006.01)
*B01D 37/00* (2006.01)
*C10L 1/18* (2006.01)
*C11B 1/00* (2006.01)
*C11B 3/00* (2006.01)
*B04B 15/06* (2006.01)
*C11B 1/06* (2006.01)
*B01D 29/62* (2006.01)
*B01D 29/76* (2006.01)
*C10L 7/04* (2006.01)
*B01D 61/20* (2006.01)

(52) U.S. Cl.
CPC ............. *B01D 61/20* (2013.01); *B01D 65/02* (2013.01); *C10L 1/1802* (2013.01); *C10L 7/04* (2013.01); *C11B 1/00* (2013.01); *C11B 1/06* (2013.01); *C11B 3/008* (2013.01); *B01D 2221/00* (2013.01); *B01D 2311/26* (2013.01)

(56) References Cited

U.S. PATENT DOCUMENTS

| | | | | |
|---|---|---|---|---|
| 5,250,182 | A * | 10/1993 | Bento | B01D 61/58 210/259 |
| 5,503,750 | A * | 4/1996 | Russo, Jr. | C12M 47/10 210/259 |
| 5,507,958 | A * | 4/1996 | White-Stevens | 210/774 |
| 5,773,076 | A * | 6/1998 | Liaw | A23J 1/12 210/641 |
| 6,254,914 | B1 * | 7/2001 | Singh et al. | 426/482 |
| 7,497,955 | B2 * | 3/2009 | Scheimann et al. | 210/709 |
| 7,566,469 | B2 * | 7/2009 | Scheimann | 426/424 |
| 7,757,702 | B2 * | 7/2010 | Henaut et al. | 137/13 |
| 7,767,836 | B2 * | 8/2010 | Cheryan | 554/13 |
| 8,192,627 | B2 * | 6/2012 | Gallop et al. | 210/634 |
| 8,986,551 | B2 * | 3/2015 | Kohl et al. | 210/774 |
| 2003/0068415 | A1 * | 4/2003 | Taylor et al. | 426/316 |
| 2006/0173169 | A1 | 8/2006 | Cheryan | |
| 2006/0194296 | A1 | 8/2006 | Hammond et al. | |
| 2007/0185219 | A1 * | 8/2007 | Argillier et al. | 516/141 |
| 2007/0210007 | A1 | 9/2007 | Scheimann et al. | |
| 2008/0176298 | A1 | 7/2008 | Randhava et al. | |
| 2008/0244965 | A1 * | 10/2008 | Tarbet Kenneth | 44/385 |
| 2009/0062581 | A1 * | 3/2009 | Appel et al. | 585/241 |
| 2009/0114394 | A1 * | 5/2009 | Javora et al. | 166/312 |
| 2009/0159523 | A1 * | 6/2009 | McCutchen | 210/360.1 |
| 2010/0004474 | A1 * | 1/2010 | Cantrell et al. | 554/8 |
| 2010/0028484 | A1 * | 2/2010 | Kriesler et al. | 426/7 |
| 2010/0108567 | A1 * | 5/2010 | Medoff | C10G 3/00 208/49 |
| 2010/0167912 | A1 * | 7/2010 | Odueyungbo | 502/56 |
| 2010/0233761 | A1 * | 9/2010 | Czartoski et al. | 435/71.1 |
| 2010/0256244 | A1 * | 10/2010 | Rey et al. | 516/135 |
| 2010/0260918 | A1 | 10/2010 | Wang et al. | |
| 2010/0274034 | A1 * | 10/2010 | Okada | C07C 29/76 554/167 |
| 2010/0276375 | A1 * | 11/2010 | Sams | 210/708 |
| 2010/0331580 | A1 | 12/2010 | Ridgley | |
| 2012/0125859 | A1 * | 5/2012 | Collins | B01D 17/0217 210/708 |
| 2013/0083620 | A1 * | 4/2013 | Hypes et al. | 366/136 |

OTHER PUBLICATIONS

Canadian Application Serial No. 2,794,369, Response filed Aug. 27, 2013 to Office Action mailed May 29, 2013, 7 pgs.
"International Application Serial No. PCT/US2012/062605, International Search Report mailed Feb. 15, 2013", 8 pgs.
"International Application Serial No. PCT/US2012/062605, Written Opinion mailed Feb. 15, 2013", 5 pgs.
"International Application Serial No. PCT/US2012/062605, International Preliminary Report on Patentability mailed May 15, 2014", 7 pgs.
"Canadian Application Serial No. 2,794,369, Office Action mailed Feb. 5, 2013", 3 pgs.
"Canadian Application Serial No. 2,794,369, Office Action mailed May 29, 2013", 3 pgs.

* cited by examiner

SELECTED SOLIDS SEPARATION

CROSS-REFERENCE TO RELATED APPLICATION

This application claims priority to U.S. Provisional Application No. 61/554,438 filed on Nov. 1, 2011, the contents of which are hereby incorporated by reference in its entirety.

BACKGROUND

Certain mechanical processors, such as centrifuges, are limited in capacity based in part on hydraulic and solids loading. Hydraulic loading is based on the actual volumetric capacity with the desired g-seconds in the centrifuge. For instance, centrifuges may be solids limited based on bearing, motor, and volumetric capacity. Typically, highly viscous process streams can limit the capacity of a centrifuge. Additionally, factors such as pH, temperature, presence of soluble solids, and the like, can also play a role in centrifuge functionality.

Some particles may be neutral buoyancy, which offsets a force of gravity and will not sink nor rise. An example of such a particle may be a germ from a grain. The germ may hold oil based on density of the fluid, causing the germ to float when being centrifuged. In another instance, the germ may hold water causing the germ to be neutral or to be approximately below the light phase when centrifuged.

SUMMARY

In various embodiments, a process is disclosed, which comprises separating selected solids (e.g., germ) from a process stream with a selected solids mechanical processor containing a filter to produce a filtrate substantially free of selected solids and a retentate containing recovered selected solids. In one embodiment, an increased amount of liquid is provided to a downstream mechanical processor as compared to a process stream without having a selected solids mechanical processor upstream provided.

The selected solids mechanical processor can be a simple or a complex selected solids mechanical processor. In an embodiment, the complex selected solids mechanical processor is a dynamic filtration device, which compresses the process stream against the filter for a time sufficient to further increase the amount of liquid provided to the downstream mechanical processor as compared to the simple selected solids mechanical processor. In another embodiment, the downstream mechanical processor is a complex mechanical processor, such as a centrifuge. In yet another embodiment, the downstream mechanical processor may be a paddle screen or another type of filtration device.

The process stream can be, in various embodiments, an alcohol production process stream, such as an ethanol production process stream, including, for example, centrate, thin stillage, partially concentrated thin stillage, concentrated thin stillage, or a combination thereof. In one embodiment, the process stream is a post-alcohol stripping process stream in an alcohol production facility. In an embodiment, bio-oil recovery is increased. In embodiments, bio-oil recovery is increased by at least about 5%, up to about 10% or higher, up to about 15% or higher, such as about 20%, or higher, or up to 100% or more, including any range there between.

In another embodiment, the downstream mechanical processor produces an emulsion concentrate or an emulsion, which is provided to a bio-oil recovery system to break the emulsion concentrate or emulsion. In another embodiment, the process can additionally or alternatively comprise removing suspended solids.

The process can further, optionally, comprise a grinding step to grind the recovered selected solids. In an embodiment, the grinding step recovers bio-oil bound in germ.

In an embodiment, an apparatus includes a dynamic filtration device configured to dynamically filter selected solids from a process stream by compressing the process stream against a filter for a time sufficient to produce a filtrate substantially free of selected solids and a retentate containing recovered selected solids, wherein additional filtrate can be forced through the filter as compared with a static separation device.

In an embodiment, a system is disclosed which comprises a selected solids mechanical processor having a filter and configured to separate selected solids from a process stream, wherein an increased amount of liquid is provided to a downstream mechanical processor as compared to a process stream having no selected solids mechanical processor. Again, the selected solids mechanical processor can be a simple or a complex selected solids mechanical processor. In another embodiment, the complex selected solids mechanical processor is a dynamic filtration device, which compresses the process stream against the filter for a time sufficient to further increase the amount of liquid provided to the downstream mechanical processor as compared to the simple selected solids mechanical processor.

The apparatuses, methods, and systems described herein allow, for a first time, separation of selected solids, such as germ, prior to downstream mechanical processing, for increased throughput, separation efficiency, and improvement of overall bio-oil recovery in an alcohol production facility.

This Summary is provided to introduce a selection of concepts in a simplified form that are further described below in the Detailed Description below. This Summary is not intended to identify key features or essential features of the claimed subject matter, nor is it intended to be used to limit the scope of the claimed subject matter. Other aspects and advantages of the claimed subject matter will be apparent from the following Detailed Description of the embodiments and the accompanying figures.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. The figures do not limit the claimed subject matter to specific embodiments described herein.

DETAILED DESCRIPTION

In the following detailed description, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present subject matter is defined only by the appended claims.

The various embodiments provide systems, which include a Selected Solids Separation™ device, such as a dynamic filtration device, and methods related thereto. Although the systems, methods, and apparatuses described herein focus primarily on separating selected solids from process streams resulting from alcohol production, any of the systems and methods described herein can be used to separate selected solids from other types of process streams.

The Detailed Description that follows begins with a brief definition section, followed by a detailed description of specific embodiments of the invention, as well as an example section and conclusion.

DEFINITIONS

The term "biomass" as used herein, refers generally to organic matter harvested or collected from a renewable biological resource as a source of energy. The renewable biological resource can include plant materials (e.g., plant biomass), animal materials, and/or materials produced biologically.

The terms "plant biomass" or "ligno-cellulosic biomass" as used herein, are intended to refer to virtually any plant-derived organic matter (woody or non-woody) available to produce energy on a sustainable basis. Plant biomass can include, but is not limited to, agricultural crop wastes and residues such as corn stover, wheat straw, rice straw, sugar cane, bagasse, and the like. Plant biomass can further include by-products of plant biomass, such as molasses. Plant biomass further includes, but is not limited to, woody energy crops, wood wastes, and residues such as trees, which can include fruit trees, such as fruit-bearing trees, (e.g., apple trees, orange trees, and the like), softwood forest thinnings, barky wastes, sawdust, paper and pulp industry waste streams, wood fiber, and the like. The skins and/or rinds of the various fruits can also be used as plant biomass. Additionally grass crops, such as various prairie grasses, including prairie cord grass, switchgrass, big bluestem, little bluestem, side oats grama, energy sorghum and the like, have the potential to be produced large-scale as additional plant biomass sources. For urban areas, potential plant biomass includes yard waste (e.g., grass clippings, leaves, tree clippings, brush, etc.) and vegetable processing waste. Plant biomass is known to be the most prevalent form of carbohydrate available in nature.

The term "biofuel" as used herein, refers to any renewable solid, liquid or gaseous fuel produced biologically, such as bio-oils, including for example, bio-oils derived from biomass. Most biofuels are originally derived from biological processes such as the photosynthesis process and can therefore be considered a solar or chemical energy source. Biofuels can be derived from biomass synthesized during photosynthesis, such as with agricultural biofuels (defined below). Other biofuels include algaculture biofuels (from algae), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biofuels also include, but are not limited to, biodiesels, bioethanol (i.e., ethanol), biogasoline, biomethanol, biobutanol, biogas, and the like.

The term "bio-oil" as used herein, refers to food-grade and non-food grade oils and fats that are derived from plants and/or animals (e.g., vegetable oils and animal fats, which contain primarily triglycerides, but can also contain fatty acids, diglycerides and monoglycerides. (As used herein, the term "fat" is understood to include "lipids"). Examples of bio-oils derived from plants include, but are not limited to, corn oil, flaxseed oil, canola oil, and the like. See also the listing of biofuel sources noted in the definition for "agricultural biofuel" below, which are also useful as sources for bio-oil.

The term "agricultural biofuel" as used herein refers to a biofuel derived from agricultural crop (e.g., grains, such as corn and soybeans) plant biomass, crop residues, grain processing facility wastes (e.g., wheat/oat hulls, corn/bean fines, out-of-specification agricultural or biomass materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinsing/cleansing streams, etc.), value-added agricultural facility byproducts (e.g., distiller's grain of any moisture content and/or syrup from ethanol production facilities, etc.), and the like. Examples of livestock include, but are not limited to, cattle, pork, turkey, or chicken. Examples of agricultural crops include, but are not limited to, any type of non-woody plant (e.g., cotton), grains, including any type of cereal grains such as corn, wheat, soybeans, sorghum, barley, oats, rye, milo, rape seeds, canola, sunflower, pennycress, and the like, herbs (e.g., peanuts), herbaceous crops such as switchgrass, alfalfa, other starch containing crops such as bagasse, surgarcane, and other oil-bearing starch or sugar based materials, and so forth. Ethanol and biodiesel are examples of agricultural biofuels.

The term "stillage" as used herein refers to a co-product produced during production of a biofuel, and is sometimes referred to as "slop." When used without qualification, the term "stillage" can refer to whole stillage, thin stillage, or concentrated stillage (such as condensed distillers soluble, commonly referred to in the industry as "syrup," which can be produced from biofuel process streams, e.g., ethanol production process streams). Such streams contain soluble organic and inorganic compounds, suspended materials containing protein, carbohydrate, and oil fractions and may have a free bio-oil component and an emulsified bio-oil component, or all of the bio-oil may be emulsified.

The term "free oil" or "free bio-oil" as used herein, refers to a bio-oil that is not emulsified, physically or chemically bound or trapped by components in the process stream and can be phase separated from the process stream, i.e., recovered from the process stream via mechanical processing and/or non-mechanical processing as defined herein.

The terms "emulsion" or "emulsified layer" as used herein refer to a mixture of two or more immiscible liquids, i.e., liquids which are sparingly soluble within each other.

The term "emulsion breaking" as used herein refers to a chemical treatment, i.e., chemical process, which causes destabilization of a stable emulsion or an emulsion concentrate, in which at least some of the stable emulsion or emulsion concentrate is broken to produce a broken emulsion, thus releasing entrapped bio-oil. As such, the term "emulsion breaking" is intended to include any type of stable emulsion "reduction" or emulsion concentrate "reduction" in which at least a portion of emulsified bio-oil in the stable emulsion or emulsion concentrate is released from an emulsified state by other than gravitational means. "Emulsion breaking" is in contrast to "phase separation."

The term "phase separation" or "phase separator" as used herein refers to a process or system during which an unstable emulsion separates into separate and distinct phases, such as occurs during creaming, e.g., the migration of bio-oil to the top (or the bottom, depending on the relative densities of the two phases) of the unstable emulsion under the influence of buoyancy. Phase separation can be accomplished by a non-mechanical process or a mechanical process. A non-mechanical phase separation refers to a passive chemical process in which the phases separate via specific density separation due to the force of gravity, i.e., separation of a static solution. A mechanical phase separation refers to a process in which phases separate due to additionally or alternatively using a man-made force such, as a centripetal force, caused by a centrifuge.

The term "stable emulsion" as used herein, refers to an emulsion consisting essentially of a bio-oil phase and an aqueous phase and which is sufficiently stable for further processing in accordance with embodiments described herein.

The term "mechanical processing" or "mechanical process" as used herein refers to interaction of a machine or device with any portion of a process stream sufficient to cause or alter motion of the process stream. Mechanical processing may be accomplished with mechanical force and/or addition and/or reduction of kinetic energy. Filtering a process stream with a dynamic filtration device is one example of a mechanical process, as is centrifuging. A mechanical process can be simple, i.e., reliant on no moving parts, such as filtering a process stream with a stationary filter, or complex, i.e., with moving parts.

The term "mechanical processor" or device as used herein refers to a machine or device (with or without moving parts) capable of carrying out mechanical processing and can further include a device capable of carrying out mechanical processing in combination with non-mechanical processing. A mechanical processor can be simple or complex. A dynamic filtration device, which includes a compression component/feature, is one example of a complex mechanical processor, as is a centrifuge, which adds centripetal force to aid phase separation caused by gravity.

The term "non-mechanical processing" or "non-mechanical process" as used herein refers to a non-mechanical process, which causes change in a process stream other than by imparting and/or altering motion of the processing stream. A non-mechanical process may include any type of chemical process such as gravity separation.

The term "non-mechanical processor" as used herein refers to a machine or device capable of carrying out non-mechanical processing on a process stream. One example of a non-mechanical processor is a gravity-settling tank.

The term "chemical processing" or "chemical process" as used herein refers to a process that changes the composition of the process stream in one or more steps with or without the use of added components and with or without added (or reduced) heat and/or added or reduced pressure. A chemical reaction is one type of chemical process. One example of such a reaction is an emulsion breaking reaction as described in U.S. Pat. No. 8,192,627, filed on May 11, 2011 assigned to ICM, Inc., and entitled, "Bio-oil Recovery Systems and Methods" (hereinafter "'627 Patent") which is hereby incorporated herein in its entirety. Other examples of a chemical process include catalysis, coagulation, and flocculation. A chemical process may also refer to a passive chemical process.

The term "passive chemical processing" or "passive chemical process" as used herein refers to a process, which allows a chemical change to occur naturally in a process stream over time without adding additional components to the process stream and/or heating and/or pressurizing the process stream. Gravity separation of phases in a process stream is one example of a passive chemical process as gravity separation uses only the force of gravity to allow separation to occur.

The term "heavy water phase" as used herein refers to an aqueous stream containing suspended solids.

The term "aqueous phase" as used herein refers to a process stream containing primarily water and solids, and which can further contain glycerin, acetic acid, sulfuric acid, residual soluble sugars, soluble proteins and trace minerals, such as Mg, Fe and Ca. In the system described in the '627 Patent, the aqueous phase further includes an amount of emulsion breaking additive (as defined therein).

The term "bio-oil phase" as used herein refers to a process stream containing primarily bio-oil, and which can further contain an amount of emulsion breaking additive and other minor components.

The term "evaporation" as used herein refers to removal or vaporization of a solvent or aqueous solution. Use of increased temperature and/or decreased pressure is one type of evaporation, which is often referred to as "flashing" or "flash evaporation."

The term "total solids" as used herein refers to all components in a process stream other than water. When used without qualification, the term "solids" is intended to refer to total solids, by weight, dry matter basis.

The term "dissolved solids" or "solubles" as used herein refers to solid particles, which are mixed sufficiently with the fluid in a process stream such that the solids do not separate from the process stream during mechanical processing.

The term "fine suspended solids stream" as used herein refers to a process stream containing suspended solid particles, i.e., "insolubles," which can be separated from the process stream. The particles in the fine suspended solids stream are primarily less than about 20 micrometers in diameter, but can also include larger solid particles.

The term "thin stillage" as used herein refers to a process stream produced as a byproduct of alcohol production (e.g., ethanol production).

The term "partially concentrated thin stillage" as used herein refers to any stillage stream more concentrated than a thin stillage stream, but not as concentrated as a concentrated thin stillage stream. Mid-stillage is one example of partially concentrated thin stillage.

The term "concentrated thin stillage" (commonly referred to in the industry as "syrup") as used herein refers to a process stream produced as a byproduct of fermentation (e.g., ethanol production) and which has been dewatered sufficiently to produce a more concentrated solids stream.

The term "selected solids" as used herein refers to components primarily located at an interface between a heavy/water phase and a light/oil phase or just below the light/oil phase in a process stream. Selected solids may further include components not at or near the interface, and, as such may include fine suspended solids. Such selected solids generally have a length and/or width or diameter greater than about 90 micrometers and can include solids orders of magnitude larger, including large pieces of non-fermentable solids. Germ is one example of a selected solid as is any solid component of a process stream containing stillage. Other examples of selected solids include, but are not limited to, fiber, and other components trapped in the stream that are greater than 90 micrometers, i.e. bran, corn stock, corn cob, etc.

The term "decanter" as used herein refers to an apparatus capable of separating solids based on density difference between two components. The apparatus for decanting may be by a mechanical process or a non-mechanical process.

The term "germ" as used herein refers to an embryo portion of a grain. Other portions of the grain may include the pericarp (bran or outer portion) and endosperm (inner portion starch component). The germ contains a major portion of grain bio-oil.

The term "retentate" as used herein refers to that portion of a process stream, which does not cross a filter, is not considered a light phase in a centrifuge, and may be retained for further processing in another production stream.

The term "filtrate" as used herein refers to that portion of a process stream, which crosses a filter and may undergo further processing.

The term "filter" as used herein refers to any type of screen or porous membrane capable of separating components from a process stream. The separation may occur based on a size of the particles or by ionic charge.

The term "static separation device" or "non-dynamic separation device" as used herein refers to a simple mechanical processor which is either configured to rely on gravity and a stationary filter to separate components, i.e., dewater a process stream (e.g., a stationary filter in a holding tank), or, given the content, flow and viscosity of a particular process stream, is a device which functions effectively as a static separation device. The resulting filtrate has a lower viscosity than the process stream. The stationary filter can be any shape and size (flat, curved, concave, or a curved concave wedge bar), and can be configured to aid gravity in separating components of a process stream.

The term "dynamic separation device" as used refers to a mechanical processor, which may be used to separate solids from liquids. One example of a dynamic separation device is a paddle screen device, which maintains a gap (between one or more movable paddles and a cylinder-shaped fixed screen) of sufficient size to cause the device to function as a simple mechanical processor under specific conditions.

The term "dynamic filtration device" as used herein refers to a simple or a complex mechanical processor. The dynamic filtration device may operate in a continuous manner, a batch matter, or a semi-continuous process and may be incorporating a compression feature to force (i.e., squeeze) a process stream containing solids, such as selected solids, against a filter to produce an increased amount of filtrate as compared with a static separation device, i.e., to dewater the process stream even more. The resulting filtrate has a lower viscosity than the process stream. Other dynamic filtration systems can include other types of complex mechanical processors, such as any type of centrifuge.

Ethanol Production Overview

Grain-based ethanol can be produced from a wet mill process, a dry grind ethanol process, or a "modified" dry grind ethanol process as is understood in the art. See, for example, Kohl, S., Ethanol 101: Overview of Ethanol Production, *Ethanol Today*, July 2003, pp. 36-37 for a detailed description of a typical dry grind ethanol process, which is incorporated herein by reference in its entirety. See also Patent '627 and the various Kohl references cited herein for additional details on dry grind and modified dry grind processes as on typical wet milling processes.

Co-products produced as a result of distillation and dehydration include whole stillage, which may be subjected to a centrifugation or decanter step to separate insoluble solids ("wet cake") from the liquid (which is oftentimes referred to as "centrate") for a period of time, depending on where it is provided within the alcohol production facility. For example, the centrate can be provided to a stillage tank, if present, or directly to the evaporators, at which point it would likely then be referred to as "thin stillage"). In a dry grind ethanol process, stillage enters evaporators in order to boil away moisture, producing a concentrated process streams and containing the soluble (dissolved) solids (and suspended solids) from the fermentation. See, for example, Kohl, S., Ethanol 101-9: Evaporation, *Ethanol Today*, May 2004, pp 36-39, which is herein incorporated by reference in its entirety.

This concentrated process stream can be mixed with the centrifuged wet cake, and the mixture sold to beef and dairy feedlots as Distillers Wet Grain with Solubles (DWGS). Alternatively, the wet cake and concentrated process stream mixture may be dried and sold as Distillers Dried Grain with Solubles (DDGS) to dairy and beef feedlots. See, for example, Kohl, S., *Ethanol* 101-10: *Drying-Production of DDGS*, Ethanol Today, June 2004, pp. 34-36, which is herein incorporated by reference in its entirety.

Depending on their oil content, certain particles, such as germ, can be inconsistently buoyant in a given process stream, depending on if the germ contains more water or oil. For example, oil-laden particles have a lower density than the process stream and will float when mechanically processed, e.g., centrifuged, thus remaining at the interface between the light/oil phase and solid/heavy phase or just below the light/oil phase in the centrifuge. This tendency to concentrate at the interface between the lower and higher density phases result in significant operational problems for density separation systems.

As such, germ particles, and other selected solids, present unique issues throughout the ethanol production process, including in the post-alcohol production portion of the system, during recovery of various ethanol co-products, such as co-products produced in processes (which, after mechanical processing, or heating and mechanical processing, are designed to recover free bio-oil and/or bio-oil present in an unstable emulsion) and in advanced processes (which, after steps which may include a chemical processing step, are designed to also recover bio-oil present in an emulsion or emulsion concentrate, include a chemical processing step). See, for example, Patent '627.

Within a mechanical processor such as a centrifuge, selected solids, such as germ particles, can function much like "expanded polystyrene beads." As such, these selected solids do not readily separate and move with either the solids/heavy phase or the light/oil phase. The foam bead effect inhibits flow through the centrifuge, which is both hydraulically and solids limited. When solids accumulate, i.e., when the "foam beads" collect at the interface between the light and heavy phases, they build up in the centrifuge bowl, thereby inhibiting flow (i.e., limiting the volume of the light phase that travels to the discharge port of the centrifuge bowl). Once the germ concentration reaches a critical mass, these particles are quickly purged, resulting not only in a sudden decrease in torque on the centrifuge, but also a lower quality bio-oil containing a high amount of selected solids, i.e., "dirty" bio-oil.

This buildup of selected solids within the centrifuge causes the interfacial composition of the feed stream exiting the centrifuge to change, because the solids build up is a sedimentary-type component that does not necessarily settle out in a settling or holding tank. Such variability leads to poor separation efficiency of the components in the process stream. See, for example, FIG. 5, which is a graph showing the increase in torque on a bio-oil centrifuge when a selected solids mechanical processor (such as a static separation device, a dynamic separation device, or a dynamic filtration device) is deactivated. In an example, the increase in torque may plug a gap between disks in a disk stack centrifuge.

DETAILED DESCRIPTION OF THE EMBODIMENTS

In contrast, in the various embodiments described herein, at least a portion up to substantially all of a pre-centrifuge process stream is provided to a selected solids mechanical processor configured to remove selected solids present in the process stream by either static separation with a static separation device or a dynamic filtration with a dynamic filtration device, both of which increase recovery of liquid contained in the process stream, with the dynamic filtration device recovering even more by compressing the process stream against the filter to cause the process stream to maintain contact with the filter throughout the filtration process.

By systematically removing the selected solids, such as germ, from the process stream entering the downstream centrifuge and simultaneously retaining an increased amount of fluid in the resultant filtrate, the composition of the flow discharged from the centrifuge remains more consistent, and, in some embodiments, the quantity of bio-oil recovered in subsequent processing steps can be increased.

In an embodiment, the dynamic filtration device allows even more liquid to remain in the resulting filtrate, as compared with the static separation device and, in some embodiments, can improve the efficiency of the bio-oil recovery process more than the static separation device. Without any type of selected solids mechanical processor, the process stream passing to the centrifuge may be about 3% and about 50% solids (depending on which evaporator the process stream is being drawn from). In another embodiment, the addition of a static separation device allows up to 90% of the liquid (vol) to pass through the filter as filtrate, i.e., allows about 10% (vol) of the liquid portion of the process stream to be retained in the retentate. In another embodiment, the dynamic filtration device allows at least about 7% (vol) up to at least about 8% (vol) more fluid to pass through the filter as filtrate, compared to a static separation device, i.e., at least about 97% (vol) up to at least about 98% (vol). In another embodiment, the dynamic filtration devices bypasses the selected solids at about 20-50% water, amounting to about 2-3% of the stream, which in some embodiments, is about 1%.

The process stream can include, for example, centrate, thin stillage or a process stream taken from any of the evaporators (which can include concentrated thin stillage and the like). The resulting filtrate can then be provided to a centrifuge feed tank for further processing with any type of process for recovering ethanol co-products, while the resulting retentate can be returned to any point earlier in the process, such as to the concentrated thin stillage stream to thereafter be dried and, optionally, further processed.

In the various embodiments described herein, a process stream resulting from the production of alcohol at an alcohol production facility is provided to a selected solids mechanical processor to produce filtrate and retentate. In one embodiment, the selected solids mechanical processor is a modified paddle screen. Use of a selected solids mechanical processor placed at an appropriate location in an alcohol production process, such as in a post-alcohol stripping process stream allows for removal of selected solids based on their location, size, and the like. In one embodiment, the screen or mesh size of the selected solids mechanical processor is adjustable. Such adjustments may be useful depending on the viscosity of the process stream and/or size and/or flow rate, and the like, of the selected solids to be removed. In various embodiments, most of the selected solids are germ. In one embodiment, substantially all of the selected solids are germ.

Figure 1:
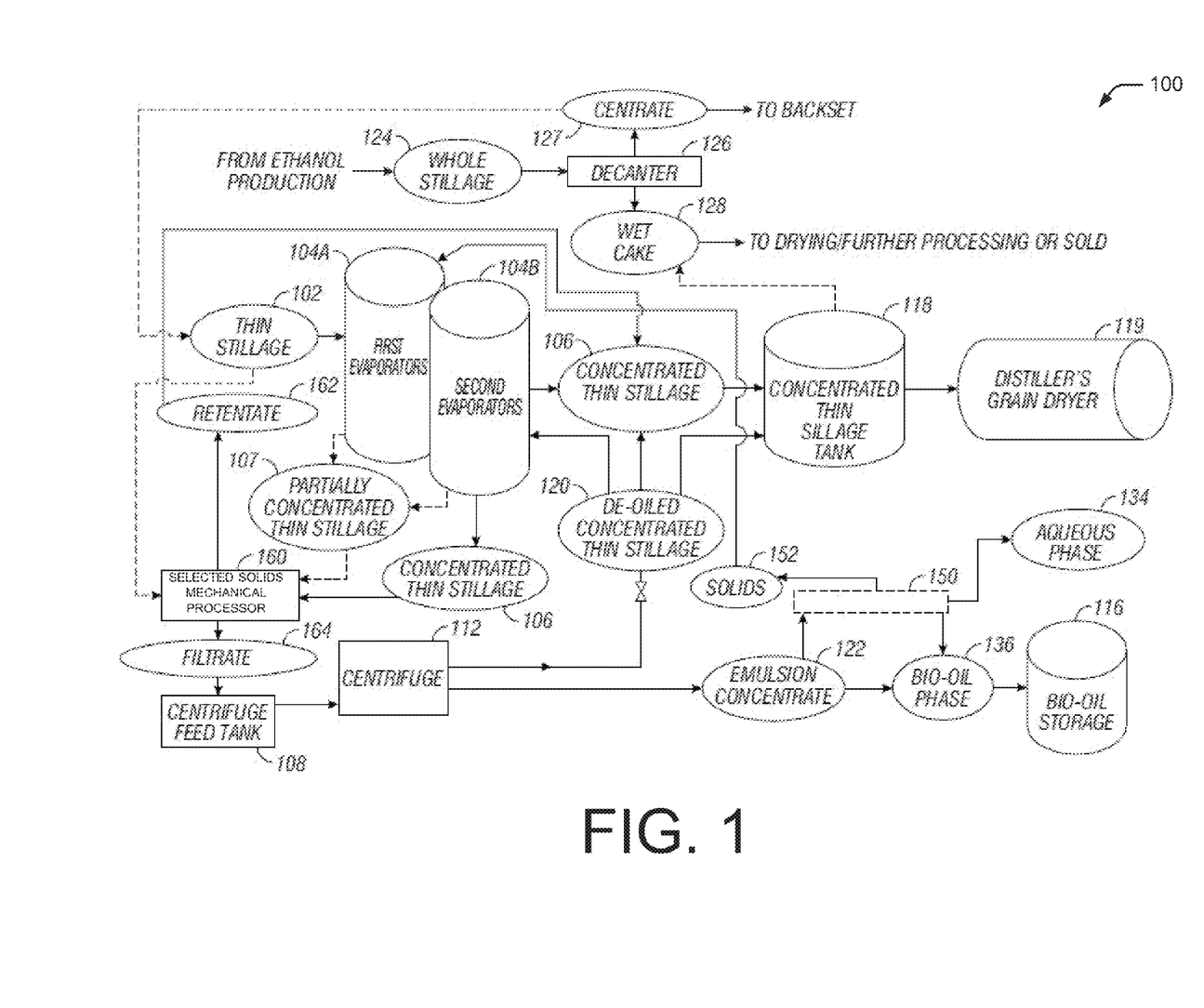
FIG. 1 is an example illustration of a system which includes a selected solids mechanical processor and an emulsion breaking system according to various embodiments.

By installing a selected solids mechanical processor (e.g., 160 in FIG. 1) prior to a downstream mechanical processing step as described herein, it is now possible to not only prevent selected solids from passing through to the downstream mechanical processor, but to also increase the liquid portion of the process stream being further processed (referred to herein as the "filtrate" (e.g., 164 in FIG. 1). In one embodiment, the selected solids mechanical processor 160 is a dynamic filtration device having a minimal to no gap between one or more paddles and a filter to ensure that the process stream maintains contact with the filter throughout the filtration process, thus essentially "squeezing" out additional filtrate from the process stream, thus providing a filtrate containing even more liquid than a static separation device to the downstream mechanical processor.

In one embodiment, a dynamic filtration system increases the amount of filtrate passing through the filter by at least about 8% vol as compared with a static separation device, such that about 98% of the liquid is retained in the filtrate. In an embodiment, the increase is at least about 9% or higher, such as nearly about 10%, to essentially capture all of the fluid present. By forcing the process stream to maintain contact with the filter throughout most, if not all of the filtration process, i.e., forcing the process stream to engage with the filter, it is possible now to not only remove at least a portion up to substantially all of the selected solids, but to also allow more of the liquid portion of the process stream to pass through the filter (i.e., in the filtrate), thus avoiding building up and purging of the selected solids within the mechanical processor. As a result, downtime needed to address the building up/purging is also avoided.

Additionally, bio-oil content remains consistent and bio-oil recovery can be increased significantly, such as up to about 20% up to about 100% as compared to bio-oil recovery without including a selected solids mechanical processor. It is also possible that bio-oil recovery with the selected solids mechanical processor can be increased even more as compared to bio-oil recovery without a selected solids filter system and method, including up to orders of magnitude higher.

In one embodiment, the Selected Solids Separation™ technology is used in combination with the "emulsion breaking system" of Patent '627 and/or with the suspended solids separation technology of U.S. patent application Ser. No. 13/531,036 filed on Jun. 22, 2012 assigned to ICM, Inc., and entitled "Suspended Solids Separation Systems and Methods" (hereinafter Application '036). In other embodiments, the methods and systems described herein can be used in combination with any bio-oil recovery systems.

Previous attempts to address problems associated with selected solids include adjusting a setting in the centrifuge (such as placement of an impeller) to reduce the amount of selected solids in the light phase that exits the centrifuge. However, with this approach, the selected solids continue to build up, eventually accumulating to such a level that the selected solids purge relatively quickly into the exit stream, creating a "wave" of material into the process stream, resulting in dirty bio-oil, as described above. Attempts to set the weir (impeller) in the centrifuge to allow the selected solids into the oil stream only results in lower quality bio-oil and/or reduced volume.

In contrast, the various embodiments described herein provide a consistent liquid feed, i.e., a liquid feed with most, if not all, of the selected solids removed, thus leading to a "steadier" and less cyclical operation of the mechanical processor, e.g., centrifuge, and increased oil production. The increased bio-oil production results from minimizing the amount of bio-oil lost into the heavy/water phase by allowing a more precise positioning of the weir within the centrifuge. Also, the absence of a fluctuating oil/water interface eliminates the cyclical loss of oil through selected solids buildup which create a temporary dam which builds up until a critical mass is reached, causing the temporary dam to break or burst, thus causing a wave or purge event.

FIG. 1 illustrates an example of a system 100, which includes a selected solids mechanical processor and an emulsion breaking system. As such, the novel embodiments described herein do not provide an ethanol process stream containing all of the selected solids originally present in the process stream to the centrifuge. Instead, a filtrate 164 containing a reduced amount of selected solids is provided to a downstream mechanical processor, such as a centrifuge 112, as shown in the system 100 in FIG. 1.

In the embodiment shown in FIG. 1, whole stillage 124 is derived from an ethanol production facility. In other embodiments, the whole stillage 124 can be derived from any type of alcohol production facility, such as a butanol production facility. The whole stillage 124 can be subjected to dewatering by a variety of means, such as by evaporation or pressing before or instead of providing to a drying zone. The system 100 shown in FIG. 1 begins by separating the whole stillage 124 in a decanter 126 as an initial "rough cut" to produce centrate 127 and wet cake 128. The wet cake 128 can then be subjected to drying and, optionally, further processing, or sold as an animal feed product known as wet distiller's grain (WGDS). A portion of the centrate 127 is provided as "backset" to the process, as is understood in the art. The other portion of the centrate 127, although compositionally the same or about the same, is referred to at this point of the process as thin stillage 102.

The thin stillage 102 enters the first evaporators 104A and then flows into the second evaporators 104B to produce concentrated thin stillage 106, which is provided to the selected solids mechanical processor 160 where the concentrated thin stillage 106 is separated into retentate 162 and filtrate 164. In an embodiment, a thin stillage holding tank (not shown) is used prior to the first evaporators 104A as a system control device by providing a quantity of thin stillage 102 for use in this portion of the system whether or not the processes upstream are operating or down for repair. Such a tank can, optionally, utilize a heat source, such as steam from an in-house source, to increase the temperature of the thin stillage 102, if desired.

The first evaporators 104A and the second evaporators 104B can each represent any number of evaporators, such as, for example, four evaporators each, for a total of eight evaporators, although the present subject matter is not so limited. The retentate 162 can be returned to the concentrated thin stillage 106 prior to entering the concentrated thin stillage tank 118 where it thereafter can be provided to the distiller's grain dryer 119 to be sold as Dried Distillers Grain with Solubles (DDGS) or added to the wet cake 128 and sold as Wet. Distillers Grain with Solubles (WGDS).

The first and second evaporators 104A and 104B can represent multiple effect evaporators, such as any number of evaporators, including, for example, eight (8) evaporators. In such embodiments, forward feeding can take place when the thin stillage 102 enters the first evaporators 104A, which, in one embodiment, can be one or more first effect evaporators, which run at the highest temperature. The thin stillage 102 is thereafter partially concentrated, as some of the water has vaporized and can be used downstream. This partially concentrated product (not shown) is then fed into the second evaporators 104B, which, in one embodiment, can be one or more second effect evaporators, which are slightly lower in temperature than the first effect evaporators. The second effect evaporators use the heated vapor created from the first stage as its source of heating. In one embodiment, the first and second evaporators, 104A and 104B, comprise first effect and second effect evaporators, which utilize recycled steam.

In one embodiment, the first effect evaporators use steam from a boiler (not shown) in the alcohol production facility (e.g., ethanol production facility) to generate process steam. This steam becomes cooled and can be re-used in a distillation step (not shown). In one embodiment, the second effect evaporators also use recycled steam. In one embodiment, direct steam from the boiler is used in the distillation step and the first and second evaporators, 104A and 104B, respectively, comprise multiple evaporators, which are run "post distillation."

In embodiments having eight (8) evaporators, the first set of four evaporators 104A can be run at temperatures as high as about 240° F. (116° C.), with a fourth evaporator run at temperatures between about 200° F. (93° C.) and about 205° F. (96° C.). In one embodiment, a vacuum on one or more of the evaporators can be increased to allow processing at higher temperatures. In other embodiments with fewer evaporators or with one evaporator, the temperatures can vary between about 22° C. and about 121° C., such as between about 130° F. (54.4° C.) and about 240° F. (116° C.), including any ranges there between.

Referring again to FIG. 1, additionally or alternatively, as shown, partially concentrated thin stillage 107 can be withdrawn from earlier in the evaporation process (i.e., often referred to as "evap train") and provided to the selected solids mechanical processor 160. Such partially concentrated thin stillage 107 can be withdrawn from any one of the evaporators comprising first and second evaporators 104A and 104B, prior to the formation of concentrated thin stillage 106. Partially concentrated thin stillage 107 can comprise, for example, mid-stillage. In one embodiment, there are eight evaporators and the partially concentrated thin stillage 107 is pulled anywhere from Evaporator 1 to Evaporator 7, such as from Evaporator 5 or 6. (For additional details on the evaporators, see Patent '627 and Application '036).

In one embodiment, the centrate 127/thin stillage 102 can additionally or alternatively be provided to the selected solids mechanical processor 160. The decision as to which process stream to provide to the selected solids mechanical processor 160 depends on several factors, including, but not limited to, the volume % of unstable emulsion present, viscosity of the various streams, flow rates, and the like, all of which can vary depending on upstream processing conditions.

Installation of the selected solids mechanical processor 160 anywhere prior to the centrifuge feed tank 108 may require an additional recovery tank and pump (not shown), with the sizing dependent on flow rate of the process stream. Placement of the selected solids mechanical processor 160 earlier in the process may result in a process stream that is less viscous, which can result in energy savings and/or a decrease in water load to the dryer. However, in such embodiments, flow rate through the selected solids mechanical processor 160 is increased. In a more viscous stream, without proper separation efficiency, the selected solids will keep that part of the stream containing entrapped oil such that this portion of the stream may not be provided to the centrifuge 112, and may be provided to the wet cake 128.

The selected solids mechanical processor 160 provides dynamic separation of the incoming concentrated thin stillage 106, for example, into a filtrate 164 and a retentate 162 by compressing selected solids contained in the thin stillage 106 against a screen (e.g., 205 in FIG. 2) for a suitable period of time to allow additional liquid to exit with the filtrate 164. The filtrate 164 can then be provided to a centrifuge feed tank 108 prior to entering a centrifuge 112. The centrifuge 112 can be any suitable type of centrifuge, including, but not limited to, a disk stack centrifuge, a hydroclone, a horizontal centrifuge (e.g., decanter or tricanter), a nozzle bowl disk stack centrifuge, and the like. In the embodiment shown in FIG. 1, the selected solids separating system 100 includes a emulsion breaking system 150 as described in Patent '627. As such, in this embodiment, the operation of the centrifuge 112 is adjusted to dewater or concentrate the concentrated thin stillage 106 to produce emulsion concentrate 122 and a de-oiled concentrated thin stillage 120, which can be returned to any evaporator in the first and second evaporators, 104A and 104B, where the evaporation process continues.

In one embodiment, there is no decanter 126 and more than one selected solids mechanical processor 160 is used, with one or more of these selected solids mechanical processor 160 used to initially perform rough separations, with subsequent selected solids mechanical processor 160 used as described herein. Even with a decanter 126, in some embodiments, it is possible to use more than one selected solids mechanical processor 160, depending on the particular application.

In the embodiment shown in FIG. 1, the emulsion concentrate 122 enters the emulsion breaking system 150 to produce a bio-oil phase 136 and an aqueous phase 134. The bio-oil phase 136 can then be provided to bio-oil storage 116 where bio-oil can be sold into various markets, such as the feed, chemical and/or biofuel oil markets at a higher selling price than "syrup" or Distillers Dry Grain with Solubles (DDGS). In other embodiments, the centrifuge 112 produces an emulsion rather than an emulsion concentrate 122.

Figure 3:
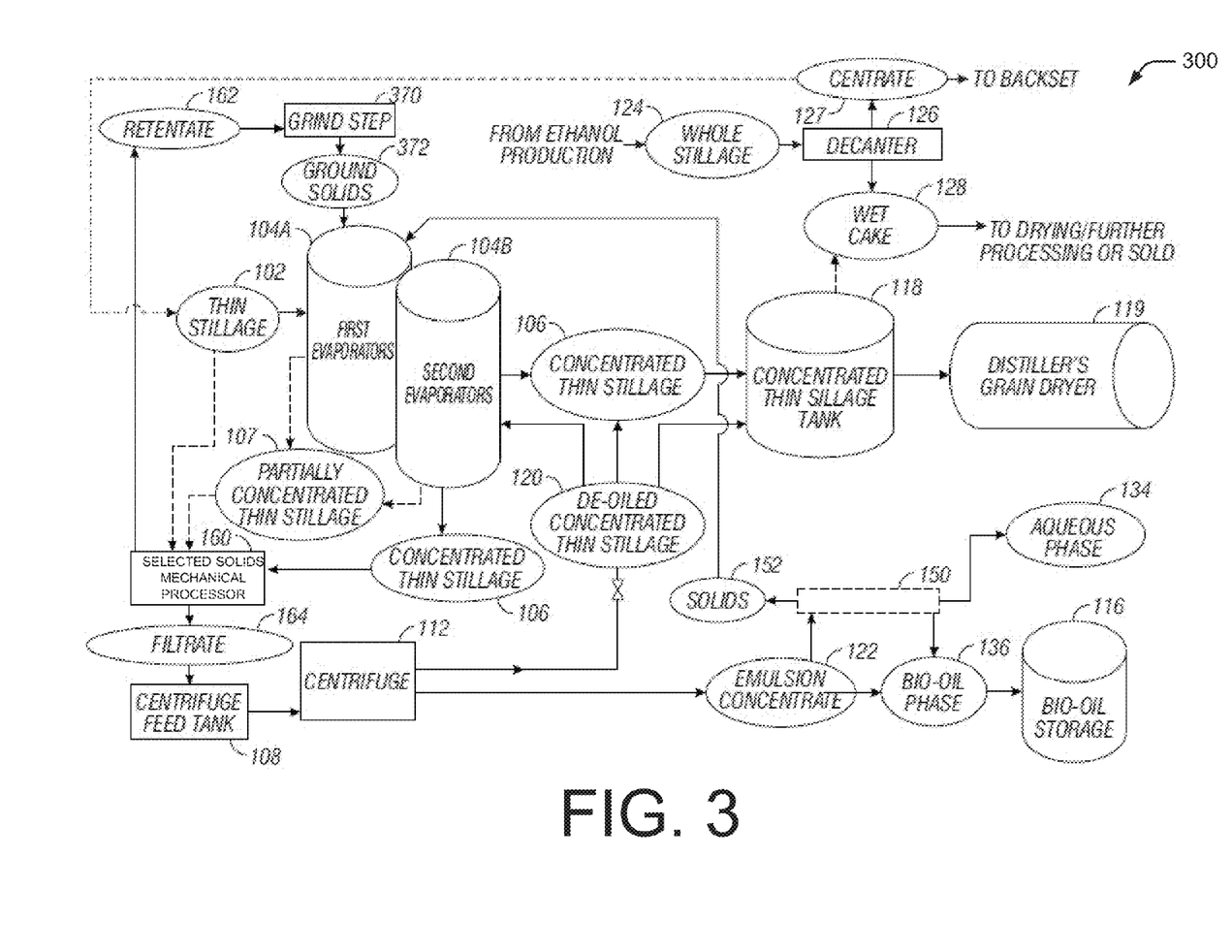
FIG. 3 is an example illustration of the system of FIG. 1 further including a grind step according to various embodiments.
Figure 4:
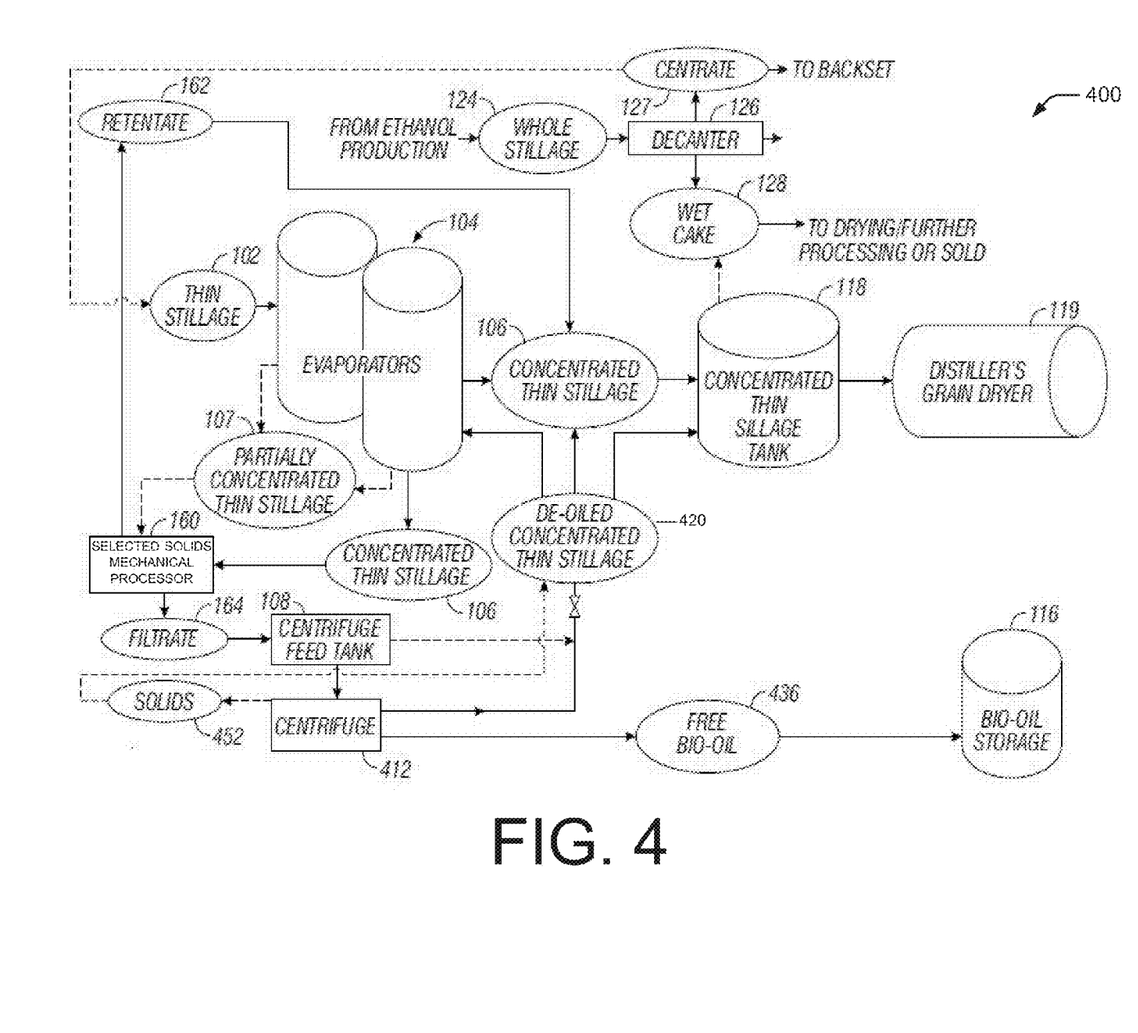
FIG. 4 is an example illustration of a system without an emulsion breaking system according to various embodiments.

The novel systems (e.g., 100, 300 and 400) described herein may be particularly useful in embodiments which include the emulsion breaking system 150, but which do not include a polishing mechanical processor, such as a polishing centrifuge (e.g., 614 in FIG. 6 of Patent '627). Use of the selected solids mechanical processor 160 in these embodiments helps to decrease the load on the centrifuge 112, such as a tricanter. The efficiency of the gravity separation can also be improved by allowing the oil to coalesce. The selected solids mechanical processor 160 can comprise any suitable device capable of separating the selected solids as described herein. In one embodiment, the selected solids mechanical processor 160 is a dynamic selected solids mechanical processor. In one embodiment, the dynamic selected solids mechanical processor is a modified commercial paddle screen, such as a modified Fluid-Quip, FQ-PS32 (Fluid-Quip, Inc., Springfield Ohio) paddle style dewatering screen.

Figure 2:
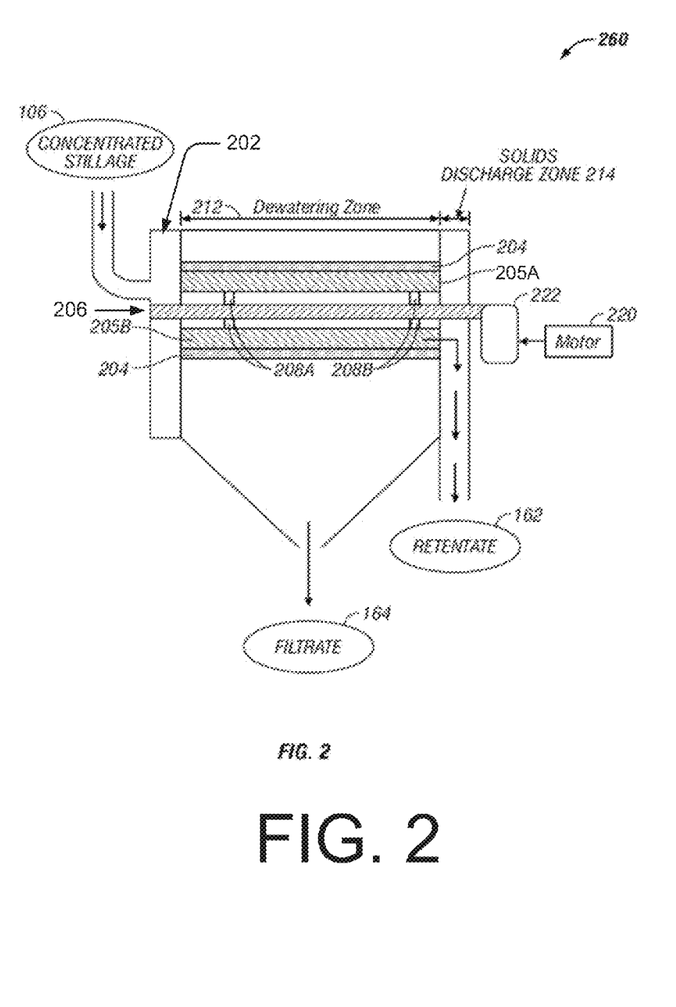
FIG. 2 is an example illustration of a dynamic filtration device according to various embodiments.

In the embodiment shown in FIG. 2, the selected solids mechanical processor 160 is a dynamic selected solids mechanical processor 260 which includes a housing 202 connected to a motor 220 via a connector 222, such as a belt and containing a fixed or stationary screen 204 with rotating paddles, 205A and 205B. As shown in FIG. 2, the paddles 205A and 205B, are secured to a hub/axle 206 of the dynamic selected solids mechanical processor 260 via posts 208A and 208B. In the embodiment shown in FIG. 2, concentrated thin stillage 106 enters the dynamic selected solids mechanical processor 260 where the concentrated stillage 106 is kept in contact with the screen 204 via the paddles 205A and 205B as the process stream passes through a dewatering zone 212, which filters out the selected solids to produce a filtrate 164 as shown. In one embodiment, the gap between the paddles 205A and 205B, is minimal, on the order of millimeters, i.e., sufficient to effect minimal clearance between the two components in order to cause the process stream, such as concentrated thin stillage 106 to be dynamically compressed as discussed. The selected solids-containing stream, i.e., the retentate 162, then enters a solids discharge zone 214 where the retentate 162 exits the dynamic selected solids mechanical processor 260.

The dewatering zone 212 of the dynamic selected solids mechanical processor 260 is longer than a solids discharge zone 214 of a paddle screen device, which typically have a length ratio of between about 1:1 to about 1.5:1 (dewatering zone: solids discharge zone). In contrast, in one embodiment, the dewatering zone 212 in the embodiment shown in FIG. 2, comprises more than 60%, such as up to 90% of the length of the screen 204, with the solids discharge zone 214 comprising the remaining portion. In this way, sufficient time is provided for the concentrated thin stillage 106 to be in contact with the screen 204, to allow dynamic filtration of the selected solids in the concentrated stillage 106.

In one embodiment, concentrated thin stillage 106 flowing at a rate of about 180 to about 200 gal/min is forced against screen 204 having a length of 32 inches for a few seconds, such as between about 2 and about 3 seconds, or less such as less than about 2 seconds or less than about 1 second, such as on the order of hundredths of a second. In other embodiments, the screen may have a length of about 24 inches or about 54 inches for less than 10 seconds. In this way, not only are most, if not all, of the selected solids present in a given process stream prevented from entering the filtrate 164 and thus, the centrifuge 112, the fluid volume of the filtrate 164 is increased sufficiently to improve bio-oil recovery downstream. In one embodiment, the screen 204 can rotate and any number of paddles (e.g., 205A and 205B) can be stationary.

In one embodiment, the selected solids filter has features comparable to those described in International Publication No. WO 2009/137452A2, which is hereby incorporated by reference herein. However, in contrast to the device described in WO 2009/137452, the modified device described herein can recover and remove selected solids prior to the process stream being provided to a post-alcohol production mechanical processor, such as the centrifuge 112.

As noted above, the screen size can be adjusted to accommodate a variety of process stream viscosities and selected solids size. In this way, flexibility is provided to the overall process. In embodiments, a 400 micron screen or greater may be used. In other embodiments, a screen size of less than 400 micron may be used, such as down to 200 microns or lower, such as down to about 150 microns or lower, such as down to about 100 microns or lower, such as down to about 50 microns or lower, such as down to about 45 microns or 25 microns, but not less than 0.01 micron. The micron screen offers flexibility in filtering the particles based on particle sizes.

The embodiment shown in FIG. 3 is a system 300, which includes a grind step 370. In this embodiment, recovered selected solids contained in the retentate 162 are ground via any suitable type of grinding, pulverizing or macerating device (such as any type of disc grind mill, commercially available, such as Fluid-Quip, FQ-138 single disc grind mill) to produce ground solids 372 to liberate the bound bio-oil. The ground solids 372 can then be provided to any suitable location in the process, such as to the first evaporators 104A as shown in FIG. 3, to recover additional bio-oil contained in the selected solids. In other embodiments, the ground solids 372 are provided to the second evaporators 104B. In one embodiment, the selected solids in the ground solids 372 comprises germ, such as corn germ, which is known to contain a significant amount of bio-oil, e.g., corn oil.

The ground solids 372 can then be returned to the process anywhere prior to the centrifuge 112. The more retention time needed for the bio-oil to leach from the ground solids 372, the earlier in the process the ground solids 372 are returned. Specifically, if the bio-oil is immediately freed in the grinding step 370, then the ground solids 372 can be added directly to the centrifuge feed tank 108. If a longer retention time is needed to allow the bio-oil to leach from the ground solids 372, then the ground solids 372 can be provided to a point further back in the process prior to the centrifuge feed tank 108 at a point which allows for the desired time to pass. In one embodiment, a retention time of up to about 1 hr, such as about 2 hrs, or about 3 hrs, or more, such as about 4 hrs to about 6 hrs used. In other embodiments, the retention time may be up to 8 hrs, 10 hrs, and 12 hrs.

FIG. 4 shows an example system 400 for processing thin stillage 102 from an alcohol production process without benefit of the bio-oil recovery system described in Patent '627. In this embodiment, the thin stillage 102 is provided to evaporators 104 for concentration. (The evaporators 104 can include any number of evaporators, and can be comparable to the first and second evaporators 104A and 104B, in FIGS. 1 and 3). A portion or all of the resulting concentrated thin stillage 106 can be provided to a selected solids mechanical processor 160 to produce retentate 162 and a filtrate 164 which is then provided to a centrifuge 412 which is adjusted to produce free bio-oil 436, de-oiled concentrated thin stillage 420, and solids 452.

The free bio-oil 436 can be provided to bio-oil storage 116 as shown. The de-oiled concentrated stillage 420 can then be returned to the evaporators 104 as shown, and/or can be provided to the concentrated thin stillage 106 or concentrated stillage tank 118. Thereafter the concentrated thin stillage 106 may be, for example, further processed, and/or taken to a distiller's grain dryer 119 and/or sold as a separate product. In alternative embodiments, the process stream can additionally or alternatively be centrate 127/thin stillage 102, or any type of partially concentrated thin stillage 106, such as mid-stillage or a molasses product.

Figure 5:
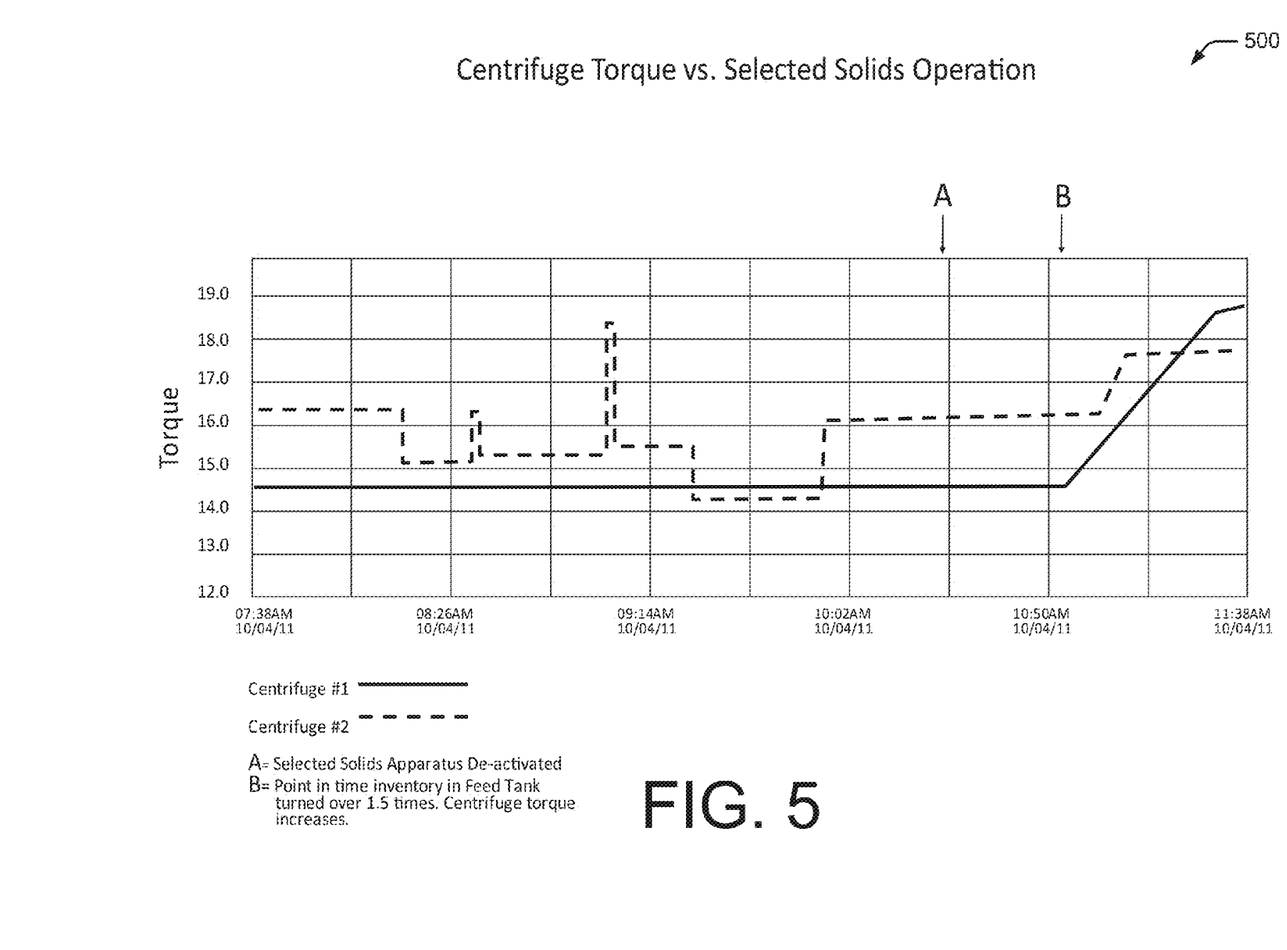
FIG. 5 is a graph showing an increase in torque on a bio-oil centrifuge when a selected solids mechanical processor is deactivated.

The graph 500 in FIG. 5 shows two bio-oil centrifuges in operation. Along the y-axis is torque measured in pounds-feet and along the x-axis are dates and times that the measurements were taken on the samples. At point A, the graph 500 shows the selected solids mechanical processor 160 has been de-activated. In response to the deactivation of the selected solids mechanical processor 160, the graph 500 shows an increase in torque for both centrifuges at point B. Centrifuge #1 shows an increase in torque from 14.5 pounds-feet to 18.7 pounds-feet. Thus, the increase in torque represents a build-up in the centrifuge bowl of the solids accumulating there.

The present subject matter is further described by reference to the following examples, which are offered to further illustrate various embodiments. It should be understood, however, that many variations and modifications may be made while remaining within the scope of the embodiments described herein.

EXAMPLES AND RESULTS

Example 1

Thin stillage starting material was obtained from a 100 million gal/year (MMgy) commercial corn-to-ethanol production facility (hereinafter "ethanol production facility").

A Fluid-Quip, FQ-PS32 (Fluid-Quip) paddle style dewatering system, the Fluid-Quip brand paddle screen having an "eccentric nut" was used. The eccentric nut was set on "1". The eccentric nut is expected to control the distance between the paddles and the screen, with a setting of "1" providing an approximately 0.25 inch gap, "2" a ⅜" gap, "3" a ½" gap and 4" a ⅝" gap.

The paddles (e.g., 205A and 205B) were configured such that their entire length was being utilized in the process. A 150 micron screen was installed. A concentrated thin stillage stream having totals solids of approximately 26% was drawn off Evaporator 6 of an eight-evaporator commercial ethanol production facility. Paddle speed was varied by adjusting amperage input on the 30 HP motor (220 in FIG. 2) from 10% to 100%. The variability of the speed did not seem to greatly affect the percentage overflow bypass, which was measured with a visual gauge of the retentate flow and a filtrate sample to measure germ and oil content.

As a result of the initial findings, a speed of 50% was selected. The retentate flow was gauged at about 10 to about 15% of the total flow based on the surrounding flow indicators on the facility's automated distributed control system. The filtrate showed an essentially 100% separation of the germ particles larger than 300 micron in the filtrate.

Example 2

In another example, the conditions were used as above except for a flow rate. For instance, the flow rate was increased to 200 GPM and the same results were observed by percentage.

Example 3

Additional testing was then performed using the equipment described above, except that a 400 micron screen was used. The filtrate showed an 80% separation of the germ particles. The flow rate was then increased to 200 GPM and the same results were observed by percentage.

Surprisingly, these results showed that the retentate was not dewatered as expected, allowing bio-oil to be bypassed. Assuming normal bio-oil content in corn this bypass would equate to a loss of about 0.8 to about 1.2 gallons per minute (gpm). Due to the separation efficiency of the 150 micron screen, further testing was performed using this screen size. However, the eccentric nut was set to "4" (a maximum distance from the screen and, with this particular unit—was about ⅝ inches) as it was thought that the viscosity of the process stream may be increasing, such that less agitation and increased speed to increase solids discharge may help.

However, the same results were obtained in this testing. The filtrate showed an essentially 100% separation of the germ particles.

Example 4

The flow rate was then increased to 200 GPM and the same results were observed by percentage.

In an effort to determine whether it was the high viscosity of the process stream keeping the selected solids from going through the screen, the process stream was drawn from a more viscous process stream, namely Evaporator 5. The paddle screen was set with the eccentric nut setting on 4, the paddles fully extended and a 150 micron screen. The flow rate was increased to 230 gpm and the same 10-15% bypass of the overflow was observed.

Example 5

The Fluid-Quip paddle style dewatering system (FQ-PS32) was substantially modified to perform in a different manner than intended by: (i) reducing the gap distance between the paddles and the screen (See, e.g., first and second paddles, 205A and 205B and screen 204 in FIG. 2) beyond the adjusting capacity of the eccentric nut's most refined setting, and (ii) further extending the dewatering zone by an additional 10 to 30% by removing several scrapers from the rotating shaft) in order to retain the selected solids. For instance, removal of three scrapers from four paddles equals 12 scrapers from a total of 16 scrapers. As a result of these modifications, the initial gap size when the eccentric nut was set to "1" was now 1/16", which each successive nut setting increasing by about 1/8".

Preliminary testing was performed with an added 3/8-inch solid round stainless steel bar having a length of about 15 3/8 inches, which was approximately the same length as original dewatering zone on the paddles. The bar served to reduce the gap distance between the paddles and screen to a few millimeters. Additionally, a notch around an inch in length was added to the front edge of the bar, in order to move the paddles closer to the inlet to ensure that the process stream was being pressed directly on the screen.

The bar also was designed to extend the dewatering zone. Specifically, the unit initially contained a dewatering zone, which comprised about 60% of the length of the screen. The original paddles also included a series of teeth or scrapers (See, for example FIG. 4 of WO 2009/137452) which were aligned with the solids discharge zone. The first three of these scrapers were cut off. This modification, in addition to the 15 3/8" length bar, served to extend the dewatering zone by about 10 inches or 90% of length (i.e., about 29 inches of a 32 inch length). The modified paddle screen device was tested with the eccentric nut setting on 1, the paddles fully extending, and a 150 micron screen. The flow rates were set at 200 GPM and a bypass of the overflow was observed at a few cups a minute. The targeted germ exited the overflow with the consistency of crumbly wet cake.

Figure 6:
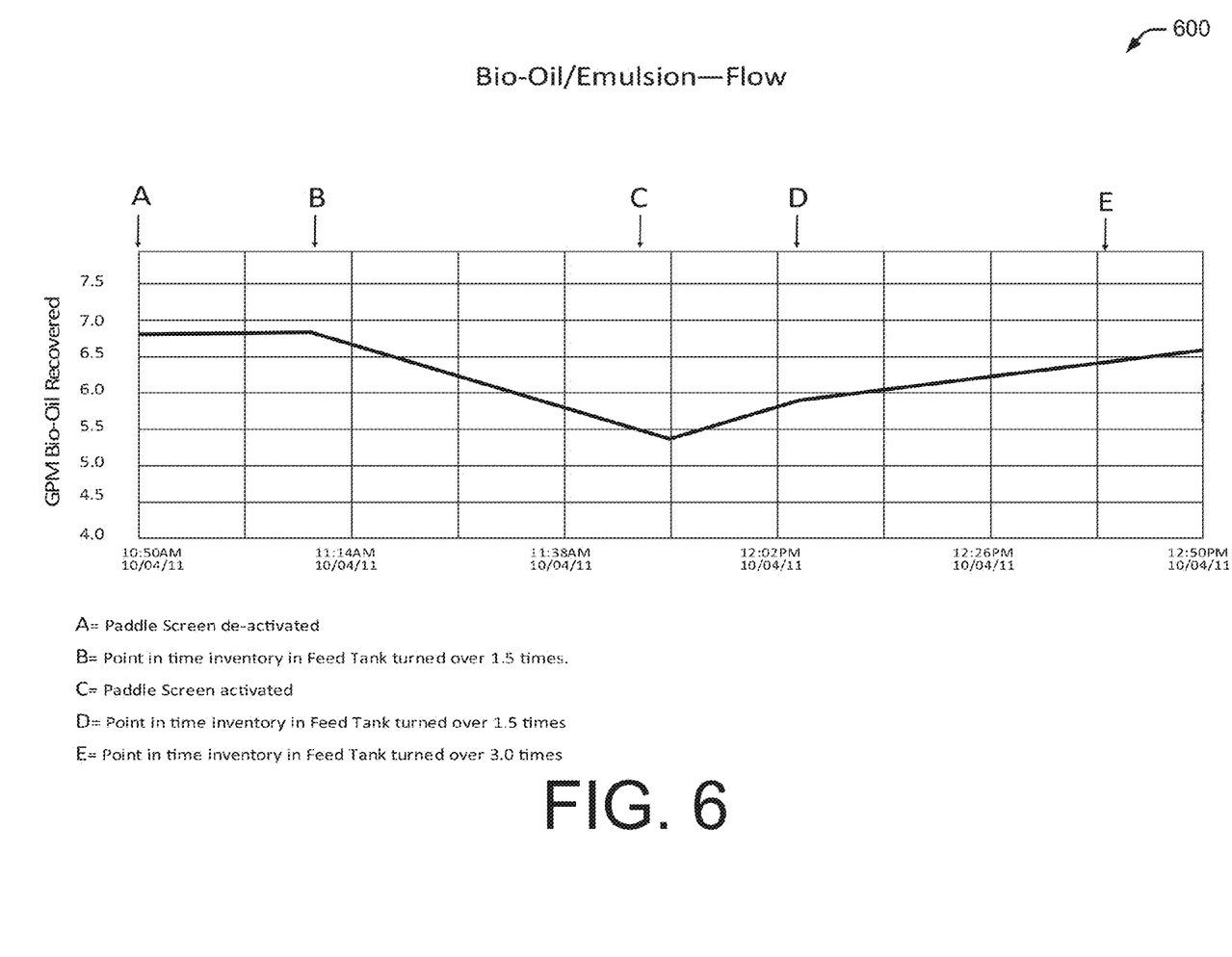
FIG. 6 is a graph showing a comparison of bio-oil output of a dynamic selected solids filtration system as compared to a conventional non-dynamic (i.e., static) Selected Solids Separation™ system according to an embodiment.

See, for example, FIG. 6, in which: 1) Set Point "A" is the point in time at which the modified paddle screen was turned off (Oil recovery rate of 6.7 GPM); 2) Set Point "B" is the point in time at which the feed tank has turned over (i.e., Original 3000 gallons replaced 1.5 times, thus re-introducing selected solids into centrifuge feed stream; 3) Set Point "C" is the point in time at which the modified paddle screen has been turned back on (new baseline oil recovery rate at 5.3 GPM); 4) Set Point "D" is the point of time at which the feed tank has turned over approximately 1.5 times, thus diluting the selected solids left over from the time period when the modified paddle screen was turned off; and 5) Set Point "E" is the point in time at which the feed tank has turned over approximately 3 times, thus removing effectively all the selected solids from the centrifuge feed stream left over from the time period when the modified paddle screen was turned off. (Oil Recovery rate back up to 6.3 GPM in the fixed time frame of the test.)

Additional testing will include modifications that further extend the dewatering zone and further minimize the gap between the screen and paddle.

CONCLUSION

By removing selected solids as described herein, it is now possible to operate an alcohol production continuously, with no down time for addressing selected solid build-up, such as germ build-up, while increasing oil recovery significantly, such as at least about 20%. In embodiments including a grinding step, bio-oil recovery can be increased even further. As such, the various embodiments described herein also provide for enhanced recovery of bio-oil from alcohol byproducts.

All publications, patents and patent documents are incorporated by reference herein, as though individually incorporated by reference, each in their entirety, as though individually incorporated by reference. In the case of any inconsistencies, the present disclosure, including any definitions therein, will prevail.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. Therefore, it is manifestly intended that embodiments of this invention be limited only by the claims and the equivalents thereof.

What is claimed is:

1. A process used in an ethanol production facility, the process comprising:

separating selected solids from a process stream in the ethanol production facility to yield a liquid substantially free of the selected solids, wherein the selected solids comprises suspended particles having a buoyancy wherein the suspended particles accumulate at an interface between light/oil and aqueous/heavy phases; and then passing the process stream through a selected solids mechanical processor to produce a filtrate substantially free of the selected solids and a retentate containing recovered selected solids, wherein the mechanical processor includes a dynamic filtration device which compresses the process stream by structure movable relative to a filter surface against a filter for a time sufficient to further decrease an amount of liquid retained in the retentate.

2. The process of claim 1, wherein the retentate has been reduced in amount of retained liquid, and the filtrate is provided to a downstream mechanical processor.

3. The process of claim 2, wherein the downstream mechanical processor is a mechanical processor.

4. The process of claim 2, wherein the downstream mechanical processor produces an emulsion concentrate or an emulsion which is provided to an emulsion breaking system to break the emulsion concentrate or the emulsion.

5. The process of claim 1, wherein the selected solids include germ.

6. The process of claim 1, wherein the process stream is an alcohol production stream comprising centrate, thin stillage, partially concentrated thin stillage, concentrated thin stillage or a combination thereof.

7. The process of claim 1, further comprising a grinding step to grind the selected solids recovered in the retentate to release bound bio-oil.

8. The process of claim 7, wherein the released bound bio-oil results in an increased amount of bio-oil recovered by at least about 5% to more than 100%.

9. The process of claim 1, further comprising a centrifuge downstream of the mechanical processor.

10. The process of claim 9, wherein the centrifuge further removes suspended solids from the filtrate.

11. The process of claim 1, further comprising a mechanical grinding device to ground the selected solids from the retentate to liberate bound bio-oil.

12. The process of claim 1, further comprising a tank to allow bio-oil to leach from the selected solids which is from the retentate, based on a retention time.

13. The process of claim 12, wherein the retention time is less than 12 hours.

* * * * *